United States Patent
Kim et al.

(10) Patent No.: US 12,550,272 B2
(45) Date of Patent: Feb. 10, 2026

(54) ELECTRONIC DEVICE INCLUDING STRUCTURE FOR DETECTING ROTATION AMOUNT OF MOTOR

(71) Applicant: SAMSUNG ELECTRONICS CO., LTD., Suwon-si (KR)

(72) Inventors: Junhyuk Kim, Suwon-si (KR); Jaehyoung You, Suwon-si (KR); Hyunggwang Kang, Suwon-si (KR); Myunghoon Kwak, Suwon-si (KR); Wonho Lee, Suwon-si (KR); Jaedeok Lim, Suwon-si (KR); Hyoungtak Cho, Suwon-si (KR); Yangwook Kim, Suwon-si (KR); Jookwan Lee, Suwon-si (KR); Soyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 127 days.

(21) Appl. No.: 17/883,481

(22) Filed: Aug. 8, 2022

(65) Prior Publication Data

US 2023/0140320 A1    May 4, 2023

Related U.S. Application Data

(63) Continuation of application No. PCT/KR2022/010232, filed on Jul. 13, 2022.

(30) Foreign Application Priority Data

Nov. 2, 2021  (KR) .................. 10-2021-0148817
Dec. 6, 2021  (KR) .................. 10-2021-0173251

(51) Int. Cl.
*H05K 5/00*     (2025.01)
*F16H 19/04*    (2006.01)
(Continued)

(52) U.S. Cl.
CPC .......... *H05K 5/0217* (2013.01); *F16H 19/04* (2013.01); *G01B 7/30* (2013.01); *G01D 5/145* (2013.01);
(Continued)

(58) Field of Classification Search
None
See application file for complete search history.

(56) References Cited

U.S. PATENT DOCUMENTS

| 3,539,817 A | 11/1970 | Darrieus |
| 9,973,061 B2 | 5/2018 | Shim et al. |

(Continued)

FOREIGN PATENT DOCUMENTS

| CN | 206740148 | 12/2017 |
| CN | 108351227 | 7/2018 |

(Continued)

OTHER PUBLICATIONS

Search Report and Written Opinion dated Oct. 19, 2022 issued in International Patent Application No. PCT/KR2022/010232.
(Continued)

*Primary Examiner* — Jerry Wu
*Assistant Examiner* — Rashen E Morrison
(74) *Attorney, Agent, or Firm* — NIXON & VANDERHYE P.C.

(57) ABSTRACT

An electronic device includes a first housing, a second housing slidably coupled to the first housing, a rollable display configured to be enlarged or reduced based on a movement of the second housing, a rack gear disposed on the second housing, a pinion gear driven in engagement with the rack gear and including a plurality of teeth, an actuator configured to rotate the pinion gear and coupled with the pinion gear by a shaft, a first magnet surrounding at least part of the shaft, and spaced apart from the pinion gear along the (Continued)

shaft, and a hall sensor spaced apart from the pinion gear in direction perpendicular to the shaft, and a processor, wherein the processor is configured to obtain data related to a change in the magnetic force using the hall sensor and identify a rotating angle of the pinion gear based on the data related to a change in the magnetic force.

19 Claims, 18 Drawing Sheets

(51) Int. Cl.
*G01B 7/30* (2006.01)
*G01D 5/14* (2006.01)
*H02K 5/04* (2006.01)
*H02K 7/116* (2006.01)
*H02K 11/24* (2016.01)
*H05K 5/02* (2006.01)

(52) U.S. Cl.
CPC ............... *H02K 5/04* (2013.01); *H02K 7/116* (2013.01); *H02K 11/24* (2016.01); *H05K 5/0018* (2022.08)

(56) References Cited

U.S. PATENT DOCUMENTS

| | | | |
|---|---|---|---|
| 10,394,282 B2 | 8/2019 | Lee et al. | |
| 10,747,269 B1 | 8/2020 | Choi et al. | |
| 10,955,876 B1* | 3/2021 | Song | G06F 1/1652 |
| 11,166,388 B2 | 11/2021 | Diboine et al. | |
| 11,775,016 B2 | 10/2023 | Choi et al. | |
| 11,910,549 B2* | 2/2024 | Ko | G06F 1/1624 |
| 2018/0313670 A1* | 11/2018 | Tanabe | G01D 5/147 |
| 2019/0371214 A1 | 12/2019 | Kim et al. | |
| 2021/0247805 A1* | 8/2021 | Min | G06F 9/4843 |
| 2022/0183167 A1* | 6/2022 | Liu | H05K 5/0217 |
| 2022/0253103 A1* | 8/2022 | Choi | G09F 9/301 |

FOREIGN PATENT DOCUMENTS

| | | |
|---|---|---|
| JP | 2006-177924 | 7/2006 |
| KR | 10-0528642 B1 | 11/2005 |
| KR | 10-2015-0121563 A | 10/2015 |
| KR | 10-2031910 | 10/2019 |
| KR | 10-2021-0068272 | 6/2021 |
| KR | 10-2267354 | 6/2021 |
| KR | 10-2273026 B1 | 6/2021 |
| KR | 10-2021-0113805 | 9/2021 |
| KR | 10-2342728 B1 | 12/2021 |
| WO | 2021/015310 | 1/2021 |
| WO | WO2021015310 A1 | 1/2021 |

OTHER PUBLICATIONS

Partial Supplemental European Search Report dated Oct. 31, 2024 for EP Application No. 22890123.7.

Extended European Search Report dated Jan. 23, 2025 for EP Application No. 22890123.7.

\* cited by examiner

ELECTRONIC DEVICE INCLUDING STRUCTURE FOR DETECTING ROTATION AMOUNT OF MOTOR

CROSS-REFERENCE TO RELATED APPLICATIONS

This application is a continuation of International Application No. PCT/KR2022/010232 designating the United States, filed on Jul. 13, 2022, in the Korean Intellectual Property Receiving Office and claiming priority to Korean Patent Application No. 10-2021-0148817, filed on Nov. 2, 2021, in the Korean Intellectual Property Office, and to Korean Patent Application No. 10-2021-0173251, filed on Dec. 6, 2021, in the Korean Intellectual Property Office, the disclosures of all of which are incorporated by reference herein in their entireties.

BACKGROUND

Field

The disclosure relates to an electronic device including a structure for detecting a rotation amount of a motor.

Description of Related Art

A portable electronic device such as a mobile device has enhanced a user portability through weight lightening and miniaturization. A width of a display bezel has decreased, and a thickness of the electronic device has decreased to miniaturize the electronic device. Even though the electronic device is miniaturized, a development of an electronic device applying a flexible display is in progress as there is a demand for the enlargement of the display.

In order to implement a large screen of a display and maintain portability of an electronic device, a structure for changing a display area of the display has been developed. A flexible display may have a foldable type in which displays are folded with each other, and a rollable type in which a portion of the display is rolled and stored in a housing, and is exposed to the outside of the housing when necessary.

Since the flexible display has a structure in which the display area of the display is changed, the electronic device including the flexible display may be required to change the display area of the flexible display or change UX. In order to change the display area of the flexible display, the electronic device may provide a method of identifying a movement distance of the flexible display to understand a degree to which the flexible display is exposed to the outside.

The technical problems to be achieved in this disclosure are not limited to those described above, and other technical problems not mentioned herein will be clearly understood by those having ordinary knowledge in the art to which the present disclosure belongs, from the following description.

SUMMARY

According to an example embodiment, an electronic device may comprise: a first housing, a second housing slidably coupled to the first housing, a rollable display configured to be enlarged or reduced based on a movement of the second housing, a rack gear disposed on the second housing, a pinion gear driven in engagement with the rack gear, an actuator configured to rotate the pinion gear and coupled with the pinion gear by a shaft, a first magnet surrounding at least part of the shaft, and spaced apart from the pinion gear along to the shaft, and a hall sensor spaced apart from the pinion gear in a direction perpendicular to the shaft, and a processor, wherein the processor is configured to obtain data related to a change in the magnetic force using the hall sensor and identify a rotating angle of the pinion gear based on the data related to a change in the magnetic force.

According to an example embodiment, a power transmission device may comprise: a motor housing including a first space and a second space distinct from the first space, a motor disposed within the first space in the motor housing, a shaft disposed within the second space extending from the motor and configured to be rotated by the motor, a partition wall separating the first space and the second space, a pinion gear disposed within the second space coupled to the shaft and including a plurality of teeth, a magnet surrounding a portion of the shaft and spaced apart from the pinion gear along to the shaft, and a hall sensor spaced apart from the pinion gear in a direction perpendicular to the rotating axis direction of the shaft, and configured to detect a magnetic force transmitted from the magnet through the shaft and the pinion gear.

An electronic device according to an embodiment can identify a movement distance of a flexible display by detecting a rotation angle of a motor.

An electronic device according to an embodiment can improve mounting efficiency of an internal space of the electronic device by fixing a magnet and a hall sensor for detecting movement of the flexible display to a designated position.

An electronic device according to an embodiment can change a size of a display area according to a change in a size of the flexible display by identifying an amount and direction of movement of the flexible display, and can change and provide a user environment provided through the display area.

The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
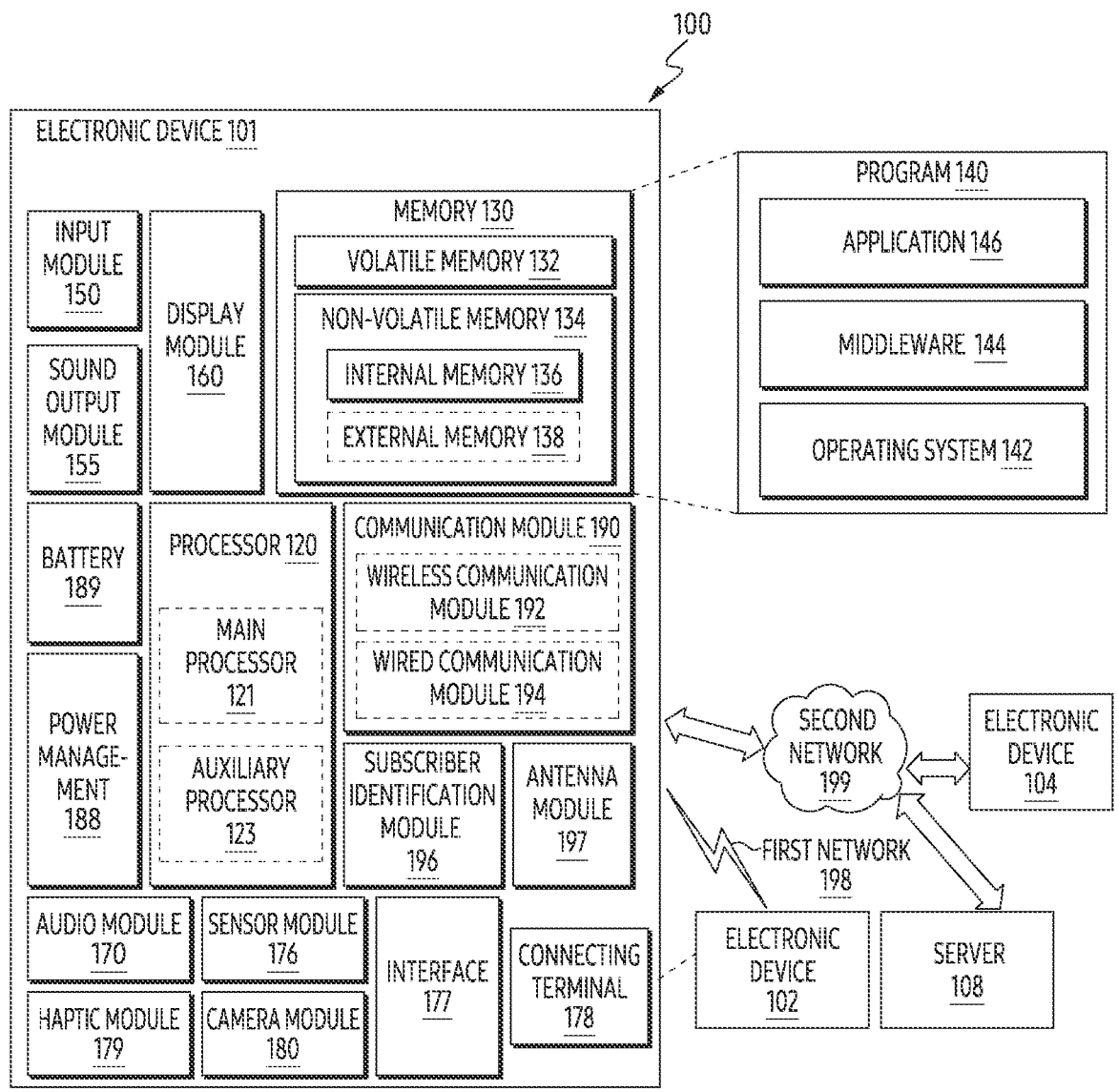
FIG. 1 is a block diagram illustrating an example electronic device in a network environment according to an embodiment.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment of the disclosure, at least one of the components (e.g., the connecting terminal 178) may be omitted from the electronic device 101, or one or more other components may be added in the electronic device 101. In an embodiment of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to address, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to certain embodiments of the disclosure, the antenna module 197 may be a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
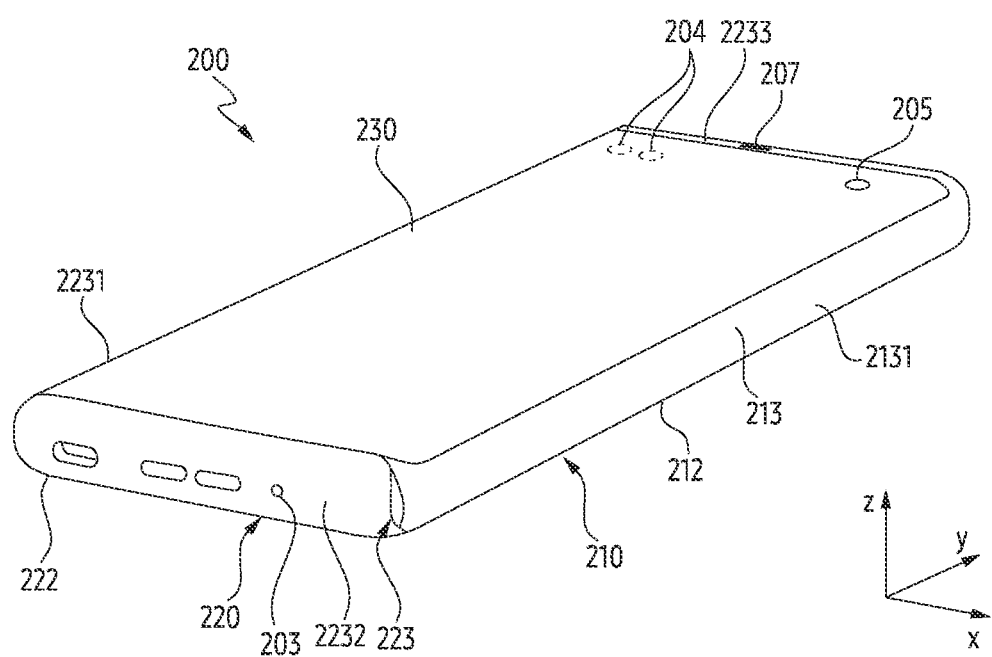
FIG. 2A is a perspective view illustrating an electronic device in a first state, according to an embodiment.
Figure 2B:
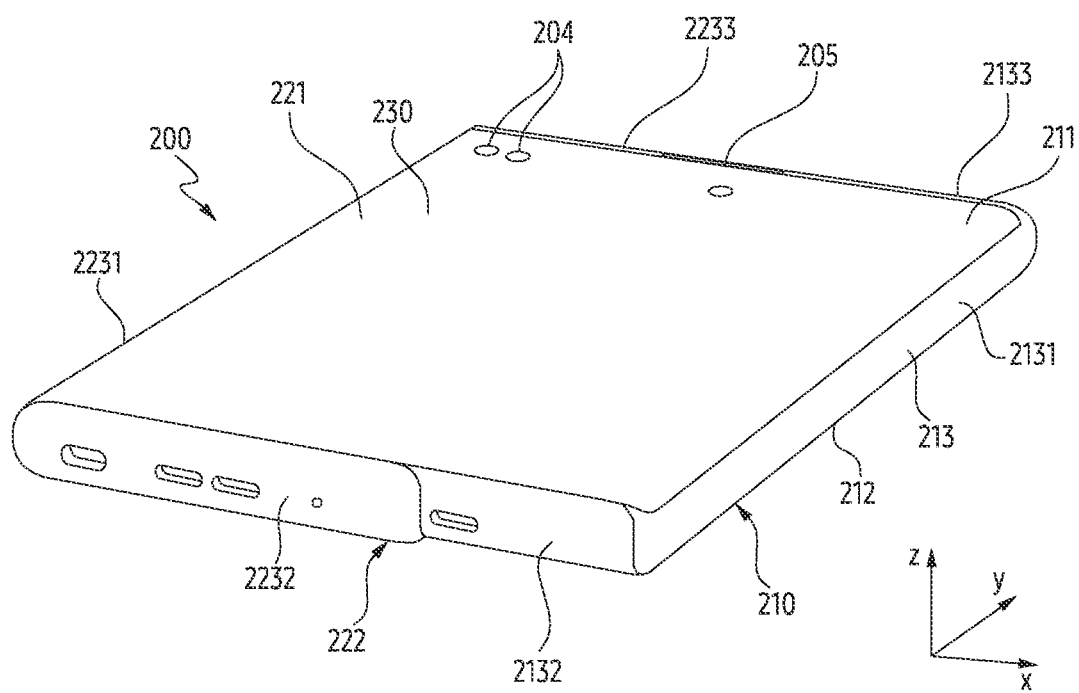
FIG. 2B is a perspective view illustrating an electronic device in a second state according to an embodiment.

FIG. 2A is a perspective view illustrating an electronic device in a first state, according to an embodiment, and FIG. 2B is a perspective view illustrating an electronic device in a second state according to an embodiment.

Referring to FIGS. 2A and 2B, an electronic device 200 may comprise a first housing 210 and a second housing 220 movably coupled to a portion of the first housing 210. According to an embodiment, the first housing 210 may include a first surface 211, a second surface 212 facing the first surface 211, and a first side frame 213 extending substantially in a perpendicular direction (e.g., in the z-axis direction) along a periphery of the first surface 211. According to an embodiment, the first side frame 213 may include a first side surface 2131, a second side surface 2132 extending from one end of the first side surface 2131, and a third side surface 2133 extending from another end of the first side surface 2131. According to an embodiment, the first housing 210 may include a first space that is at least partially closed from the outside through the first surface 211 and the first side frame 213.

According to an embodiment, the second housing 220 may include a third surface 221, a fourth surface 222 facing the third surface 221, and a second side frame 223 extending substantially in a perpendicular direction (e.g., in the z-axis direction) along a periphery of the third surface 221. According to an embodiment, the second side frame 223 may include a fourth side surface 2231 facing in an opposite direction to the first side surface 2131, a fifth side surface 2232 extending from one end of the fourth side surface 2231 and coupled to a portion of the second side surface 2132, and a sixth side surface 2233 extending from another end of the fourth side surface 2231 and at least partially coupled to the third side surface 2133. In an embodiment, the fourth side surface 2231 may extend from a structure other than the third side surface 221 and may be coupled to the third side surface 221.

According to an embodiment, the first surface 211 of the first housing 210 and the second surface 221 of the second housing 220 may be substantially the same plane.

According to an embodiment, the second housing 220 may include a second space that is at least partially closed from the outside through the third surface 221, the fourth surface 222, and the second side frame 223. According to an embodiment, the first surface 211 and the third surface 221 may be disposed to form a rear surface of the electronic device 200 at least partially. For example, the first surface 211, the third surface 221, the first side frame 213, and the second side frame 223 may be formed of a polymer, a coated or colored glass, a ceramic, a metal (e.g., aluminum, stainless steel (SUS), or magnesium), or a combination of at least two of the materials.

According to an embodiment, the electronic device 200 may include a flexible display 230 disposed to be supported by the first housing 210 and the second housing 220. According to an embodiment, the flexible display 230 may include a plane portion supported by the second housing 220 and a bendable portion extending from the plane portion and supported by the first housing 210. For example, the flexible display 230 may be disposed on the first surface 211 of the first housing 210 and the third surface 221 of the second housing 220. The flexible display 230 may be formed as a substantially continuous surface by the first surface 211 and the third surface 221 formed as substantially the same surface.

According to an embodiment, the bendable portion of the flexible display 230 may be disposed so as not to be exposed (e.g., visible. As used herein, the terms "exposed" and "visible" may be used interchangeably to describe the bendable or hidden portions of the extendible display when the display is extended or the display is enlarged) to the outside in the first space of the first housing 210 in a state in which the electronic device 200 is closed, and exposed to the outside so as to extend from the plane portion while being supported by the first housing 210 in a state in which the electronic device 200 is opened. Accordingly, the electronic device 200 may be an electronic device of rollable type in which a display screen of the flexible display 230 is enlarged according to an opening operation according to movement of the first housing 210 from the second housing 220.

According to an embodiment, the first housing 210 of the electronic device 200 may be at least partially inserted into the second space of the second housing 220 and movably coupled to a portion of the second housing in an x-axis direction.

According to an embodiment, in an open state, the flexible display 230 may be supported by the first housing 210 and/or the second housing 220 so that both ends have curved edges.

According to an embodiment, the electronic device 200 may automatically change to an open state and a closed state through a power transmission device (e.g., the power transmission device 300 of FIG. 3) disposed in the first space and/or the second space. For example, when the processor (e.g., the processor 120 of FIG. 1) of the electronic device 200 detects an event for changing the open/closed state of the electronic device 200, the processor may be set to control an operation of the first housing 210 through an actuator 260. In an embodiment, the first housing 210 may be manually protruded from the second housing 220 through a user's operation.

The processor (e.g., the processor 120 of FIG. 1) of the electronic device 200 may display an object in various ways in response to a display area corresponding to a certain amount of protrusion of the first housing 210 and may control to execute an application program.

According to an embodiment, the electronic device 200 may include at least one of an input device 203, a sound output device 207, a sensor module 204, a camera module 205, a key input device (not shown), and an indicator (not shown).

According to an embodiment, the input device 203 may be referred to as a microphone. The input device 203 may include a plurality of microphones disposed to detect the direction of sound. The sound output device 207 may be a speaker.

According to an embodiment, the sensor module 204 may generate an electrical signal or data value corresponding to an internal operating state of the electronic device 200 or an external environmental state.

According to an embodiment, the camera module 205 may be disposed on the front surface of the second housing 220 of the electronic device 200. A camera device may include a camera module including a plurality of cameras disposed on the rear surface of the electronic device 200. According to an embodiment, the camera devices may include one or a plurality of lenses, an image sensor, and/or an image signal processor. According to an embodiment, the camera module 205 may be disposed under the flexible display 230 and may be configured to photograph a subject through a portion of an activation area of the flexible display 230.

According to an embodiment, the electronic device 200 may include at least one antenna (not shown).

Figure 3:
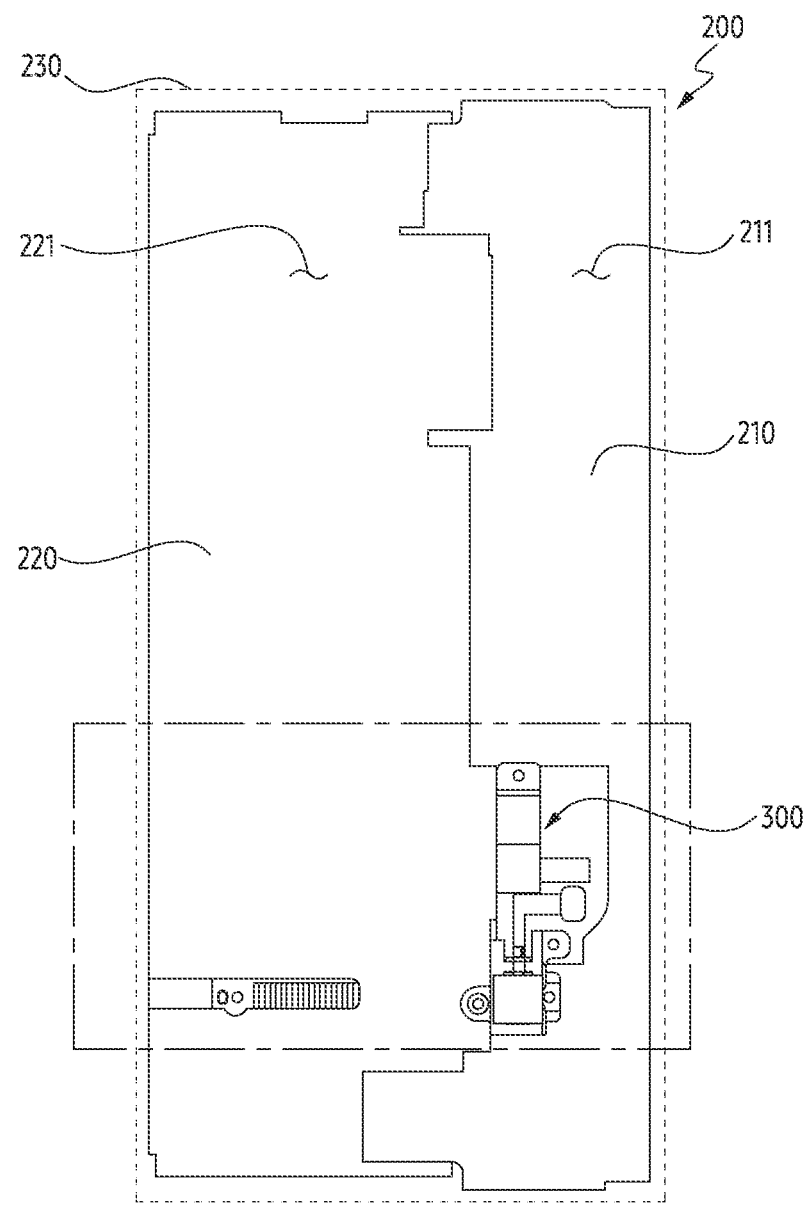
FIG. 3 is a diagram illustrating an internal structure in which a display of an electronic device is removed, according to an embodiment.
Figure 3:
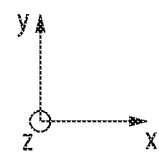
Figure 4:
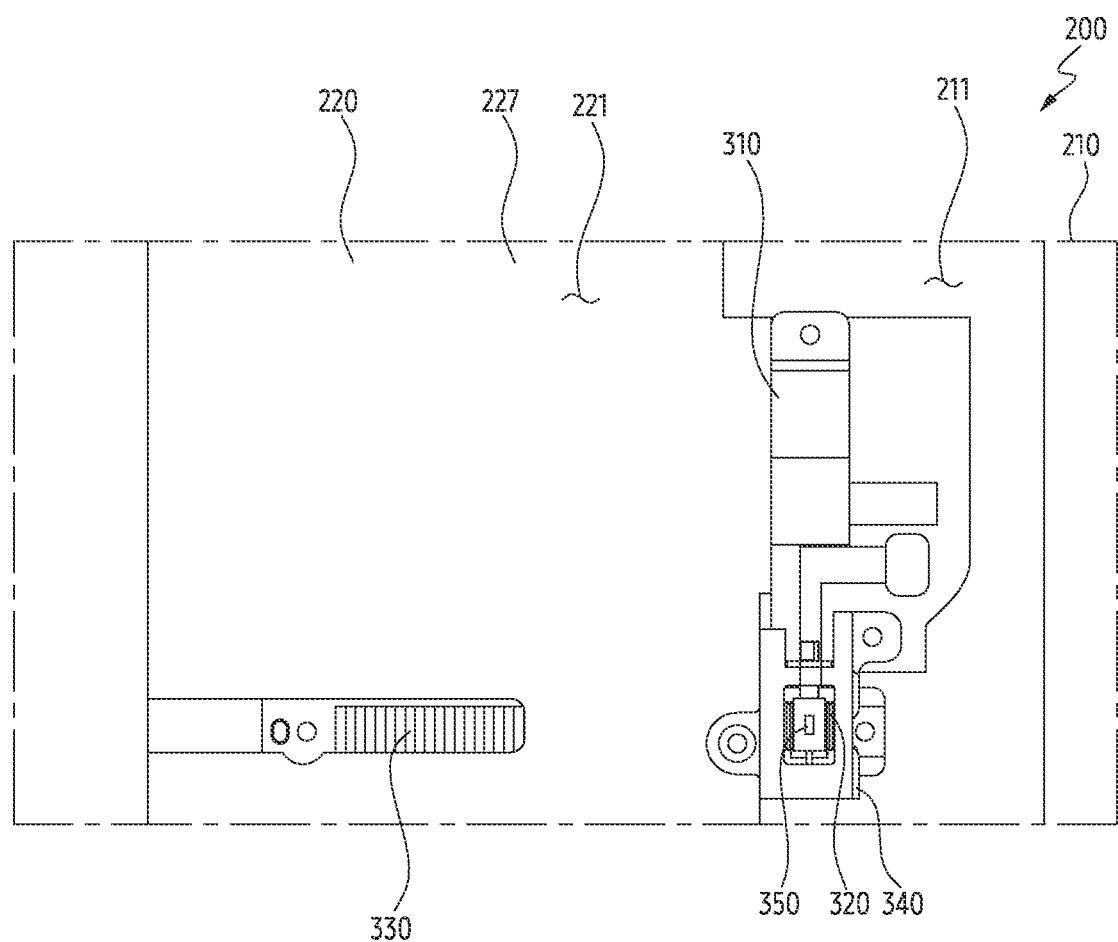
FIG. 4 is an enlarged view of area A of FIG. 3 of an electronic device according to an embodiment.

FIG. 3 is a diagram illustrating an internal structure in which a display of an electronic device is removed, according to an embodiment. FIG. 4 is an enlarged view of area A of FIG. 3 of an electronic device according to an embodiment.

Referring to FIG. 3, an electronic device 200 may include a first housing 210, a second housing 220, a display 230, and a power transmission device 300.

According to an embodiment, the first housing 210 may include a first surface 211 and a second surface 212 (e.g., the second surface 212 of FIG. 2A) facing in a direction opposite to the first surface 211. A second housing 220 may include a third surface 221 facing a same direction as the first surface 211 and a fourth surface 222 facing in a direction opposite to the third surface 221. The second housing 220 may be slidably coupled to a portion of the first housing 210 in a first direction (+x-axis direction).

The second housing 220 may move in the first direction (+x-axis direction) or in the opposite direction (−x-axis direction) to the first direction with respect to the first housing 210 by the power transmission device 300. The second housing 220 may be coupled to a portion of the power transmission device 300 disposed in the first housing 210. The display 230 may be disposed on the first surface 211 of the first housing 210 and the third surface 221 of the second housing 220. A portion of the display 230 may be fastened to the second housing 220, and a remaining portion of the display 230 may be exposed to the outside according to the movement of the second housing 220. The remaining portion of the display 230 may be wound and stored in the first housing 210. For example, the exposed portion of the display 230 may face a second direction (+z-axis direction) perpendicular to the first direction (+x-axis direction). The first state, which is the open state, may be a state in which the second housing 220 is no longer moved away from the first housing 210. For example, the first state may be a state in which a periphery far from the power transmission device 300 among the peripheries of the second housing 220 is no longer distant from the power transmission device 300. The first state may be a state in which most of the display area of the display 230 faces the second direction (+z axis direction). The first state is a state in which the second housing 220 may move only in the first direction (+x-axis direction) so that the display 230 may be reduced. The second state, which is a closed state, may be a state in which the second housing 220 moves toward the first housing 210 and may not move any more in the first direction (+x-axis direction). For example, the second state may be a state in which a periphery far from the power transmission device 300 among the peripheries of the first housing 220 is no longer close to the power transmission device 300. The second state may be a state in which the second housing 220 is movable in a direction opposite to the first direction (−x-axis direction), so that the display 230 may be enlarged. The third state may be a state in which the second housing 220 may move in both the first direction (+x-axis direction) or the opposite direction (−x-axis direction) to the first direction with respect to the first housing 210. The third state may be a state in which the display 230 may be enlarged and reduced.

Referring to FIG. 4, a plate forming the third surface 221 of the second housing 220 may be coupled to a rack gear 330 having a length and extending in the first direction (+x-axis direction). The rack gear 330 may engage with the pinion gear 320 and move in the first direction (+x-axis direction) or in the opposite direction (−x-axis direction) to the first direction according to the rotation of the pinion gear 320. By the movement of the pinion gear 320, the second housing 220 may move in the first direction (+x-axis direction) to reduce the display 230, or may move in the direction opposite to the first direction (−x-axis direction) to enlarge the display 230.

According to an embodiment, the pinion gear 320 may be engaged with the rack gear 330. For example, a portion of the gears of the pinion gear 320 may be engaged with a portion of the gears of the rack gear 330. In the state of looking at the pinion gear 320 in the first direction (+x-axis direction) and a direction (+z-axis direction) perpendicular to the second direction (+y-axis direction), the rack gear 330 may move in the first direction (+x-axis direction) when the pinion gear 320 rotates counterclockwise, and move in a direction opposite to the first direction (−x-axis direction) when the pinion gear 320 rotates clockwise.

The actuator 310 may rotate the pinion gear 320 through a shaft coupled to the pinion gear 320. The actuator 310 may be supported by the first housing 210, and may convert an electrical energy into kinetic energy to transmit rotational force to the pinion gear 320. The actuator 310 may be referred to as a motor. For example, the actuator 310 may be a step-motor. In order to generate sufficient power while reducing the size of components according to the limited mounting space in the electronic device, the actuator 310 may be a step motor. The actuator 310, which is a step motor, may provide rotation of a designated angle to the pinion gear 320. The actuator 310 may rotate the pinion gear 320 coupled to the shaft of the actuator 310 and move the rack gear 330 according to the rotation of the pinion gear 320. The actuator 310 may enlarge or reduce the display 230 to a designated length.

The hall sensor 350 may be disposed to be spaced apart from the pinion gear 320 in the second direction (+z-axis direction). The hall sensor 350 may detect the direction and magnitude of the magnetic force around the hall sensor 350. For example, the hall sensor 350 may detect the magnetic force transmitted through the pinion gear 320. The pinion gear 320 may transmit the magnetic force generated by magnets disposed around the axis of the actuator 310 to the hall sensor 350. The magnets may be disposed in the motor housing 340 and disposed around the axis of the actuator 310.

The hall sensor 350 may obtain data related to an intensity and direction of the magnetic force transmitted through the pinion gear 320, and the processor (e.g., the processor 120 of FIG. 1) may identify a rotation angle of the pinion gear based on data related to the change in the magnetic force. For example, the processor 120 may obtain data related to the intensity and direction of the magnetic force transmitted through the pinion gear 320 through the hall sensor 350. As the pinion gear 320 is rotated by the actuator 310, a distance between the gear of the pinion gear 320 and the hall sensor 350 may be changed. By changing the distance between the pinion gear 320 and the Hall sensor 350, the intensity and direction of the magnetic force transmitted to the Hall sensor 350 may be changed. By changing the intensity and direction of the magnetic force transmitted to the hall sensor 350, the processor 120 may obtain the rotation direction and rotation angle of the actuator 310.

According to the above-described embodiment, the electronic device 200 may identify a movement distance of the second housing 220 by identifying the rotation direction and the rotation angle of the actuator 310, and identify an area in which the display 230 is exposed in the second direction (+z-axis direction). The electronic device 200 may determine an activation area of the display 230 or set a user environment of the display 230 based on the exposed area of the identified display 230.

According to the above-described embodiment, even when the hall sensor 350 and the magnet are disposed at designated positions, the electronic device 200 may identify the rotation angle and the rotation direction of the actuator 310, thereby enabling a stable operation. For example, although accurate position measurement may be difficult due to interference by surrounding signals when the hall sensor 350 or the magnet moves, the electronic device 200 according to an embodiment may identify a rotation angle and a rotation direction of the actuator 310 without moving the hall sensor 350 or the magnet.

According to an embodiment, as selecting the step motor as the drive, the electronic device 200 may secure a mounting space inside the electronic device 200 and omit an encoder for identifying a rotation angle of the motor, thereby reducing the overall size of the power transmission device 300.

Figure 5A:
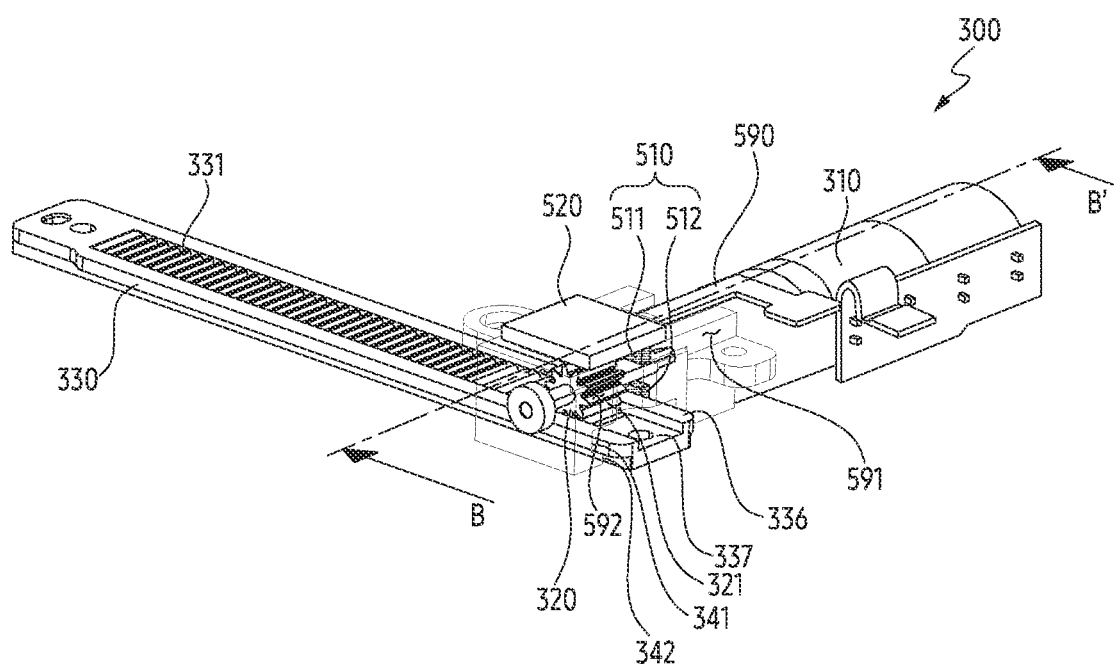
FIG. 5A is a perspective view illustrating an electronic device and a power transmission structure of the electronic device, according to an embodiment.
Figure 5B:
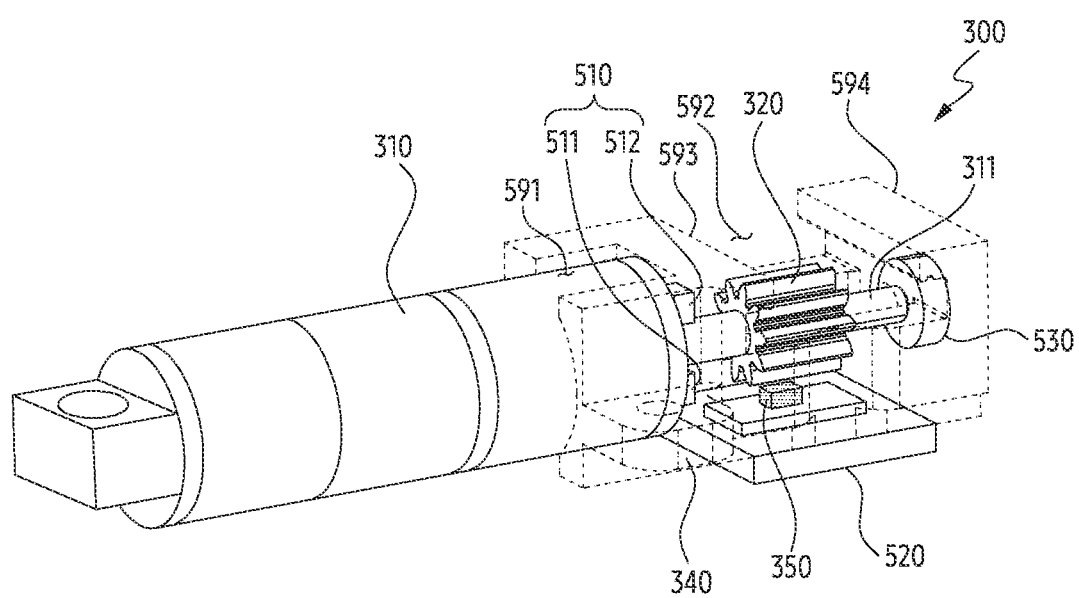
FIG. 5B is a perspective view illustrating a structure of a power transmission device according to an embodiment.

FIG. 5A is a perspective view illustrating an electronic device and a power transmission structure of the electronic device according to an embodiment, and FIG. 5B is a perspective view illustrating a structure of a power transmission device according to an embodiment.

Referring to FIGS. 5A and 5B, the power transmission device 300 may include a motor housing 340, an actuator 310, a shaft 311, a pinion gear 320, a magnet set 510, a hall sensor 350, and/or a metal plate 520.

According to an embodiment, the motor housing 340 may include a first space 591 and a second space 592. The motor housing 340 may accommodate a portion of the drive unit 310 that is a motor, the shaft 311 of the drive unit 310, the pinion gear 320 connected to the shaft 311, and the rack gear 330 engaged with the pinion gear 320. The motor housing 340 may support the components that configure the power transmission device 300 and may couple the power transmission device 300 to the second housing 220 of the electronic device 200 (e.g., the electronic device 200 of FIG. 2).

According to an embodiment, the actuator 310 may occupy the first space 591 of the motor housing 340. The actuator 310 may be seated on the first space 591 of the motor housing 340 and fixed in the electronic device 200.

According to an embodiment, a portion of the shaft 311, a pinion gear 320 connected to the shaft 311, and a portion of the rack gear 330 engaged with the pinion gear 320 may be disposed in the second space 592 of the motor housing 340. The motor housing 340 may include a partition wall 593 separating the first space 591 and the second space 592. The partition wall 593 may include a through hole through which the shaft 311 of the actuator 310 may pass. The partition wall 593 may rotatably support the shaft 311. The shaft 311 may extend from the actuator 310, pass through the first partition wall 593, and extend into the second space 592. The shaft 311 may receive a power from the actuator 310 and rotate. The second space 592 may be surrounded by the first partition wall 593 and the second partition wall 593.

The first partition wall 593 may distinguish between the first space 591 and the second space 592, and the second partition wall 593 may form a portion of an outer surface of the motor housing 340. The first partition wall 593 may face the second partition wall 594. The shaft 311 may extend from the actuator 310 and pass through the first partition wall 593.

A portion of the shaft 311 passing through the first partition wall 593 may be surrounded by a first bearing (not shown), and an end portion of the shaft 311 inserted into the second partition wall 594 may be surrounded by the second bearing 530. The inner diameters of each of the first bearing and the second bearing 530 may correspond to the diameters of the shaft 311.

According to an embodiment, the pinion gear 320 may be fastened to the shaft 311. The shaft 311 may pass through the pinion gear 320, and the rotation shaft of the shaft 311 and the driving shaft of the actuator 310 may pass through the center of the pinion gear 320. As the pinion gear 320 is fixed to the shaft 311, the pinion gear 320 may rotate by rotation of the shaft 311. The pinion gear 320 may receive power transmitted from the actuator 310 through rotation of the shaft 311.

The pinion gear 320 may be engaged with the rack gear 330. The rack gear 330 may include gear teeth 331 corresponding to the gear teeth of the pinion gear 320 formed on one surface thereof. According to the rotation of the pinion gear 320, the rack gear 330 may move in a direction perpendicular to the rotation axis of the pinion gear 320. By the pinion gear 320 and the rack gear 330, the power transmission device 300 may convert the rotational motion into a linear motion.

According to an embodiment, the magnet set 510 may be disposed to surround a portion of the shaft 311. The magnet set 510 may be disposed to be spaced apart from the pinion gear 320 in the rotational axis direction. For example, the magnet set 510 may be spaced apart from the outer circumferential surface of the shaft 311 and may surround the shaft 311. The magnet set 510 may be spaced apart from the pinion gear 320 and disposed to contact the motor housing 340. For example, the pinion gear 320 may be disposed in the second space 592 formed by the first partition wall 593 and the second partition wall 594 of the motor housing 340. The pinion gear 320 may be spaced apart from each of the first partition wall 593 and the second partition wall 594 and may be positioned in the second space 592. The magnet set 510 may be attached to the motor housing 340 and supported by the motor housing 340. A plurality of magnets 511 may be attached to the motor housing 340 using an adhesive or an adhesive tape. The magnet set 510 may be attached to the first partition wall 593 or the second partition wall 594 of the motor housing 340. Since a plurality of magnets 511 and 512 are coupled within the motor housing 340, the plurality of magnets 511 and 512 may be fixed even when the actuator 310 rotates.

According to an embodiment, the magnet set 510 may include a plurality of magnets 511 and 512. The plurality of magnets 511 and 512 may be symmetrical with respect to a rotation axis of the shaft 311. For example, the first magnet 511 and the second magnet 512 may be spaced apart from the shaft 311 by substantially the same distance. The magnet set 510 may include the plurality of magnets 511 and 512, but is not limited thereto. For example, the magnet set 510 may be formed in a doughnut shape to surround the shaft 311.

According to an embodiment, the rack gear 330 may be inserted into a guide groove 342 of the motor housing 340 and disposed on one surface of the motor housing 340. The motor housing 340 may include a guide groove 342 for guiding movement of the rack gear 330 and maintaining engagement with the pinion gear 320. The guide groove 342 may be formed on an inner surface of the motor housing 340 forming the second space 592. The motor housing 340 may include a support part 341 protruding from the guide groove 342 and supporting the guide groove 342 in order to support the rack gear 330. The guide groove 342 may be formed in the first partition wall 593 and the second partition wall 594 forming the second space 592, and the support part 341 may be in contact with the guide groove 342 and may be formed at an end of the first partition wall 593 and/or the second partition wall 594.

According to an embodiment, the rack gear 330 may include a recess 337 in which gear teeth 331 are disposed, and may include a guide rail 336 having a height toward the shaft 311 than the recess 337. For example, a distance between the recess 337 and the shaft 311 may be longer than a distance between the guide rail 336 and the shaft 311. As the guide rail 336 is inserted into the guide groove 342, the moving direction of the rack gear 330 may be guided, and the rack gear 330 may be supported by the guide groove 342.

According to an embodiment, the hall sensor 350 may be disposed to face the pinion gear 320. The hall sensor 350 may be spaced apart from the pinion gear 320 in a direction perpendicular to the rotation axis direction of the shaft 311. The hall sensor 350 may detect magnetic force transmitted from the magnet set 510 through the shaft 311 and the pinion gear 320. The hall sensor 350 may be disposed on another surface facing one surface of the motor housing 340 on which the rack gear 330 is disposed. The hall sensor 350 may detect the magnitude and direction of the magnetic force.

According to an embodiment, the metal plate 520 may be disposed in an area (e.g., an area facing an area in which the rack gear 330 is located with respect to the shaft 311) of the motor housing 340 in which the hall sensor 350 is located.

The metal plate 520 may be configured such that the direction of a magnetic force line emitted from the pinion gear 320 passes through the hall sensor 350 and is formed along the shape of the metal plate 520. The metal plate 520 may increase the accuracy of detecting a magnetic field change using the hall sensor 350 according to the rotation of the pinion gear 320 by increasing the intensity of the magnetic field passing through the hall sensor 350. The metal plate 520 may include an SPCC steel plate which is a ferromagnetic material to induce magnetic force. The metal plate 520 may face the pinion gear 320, and the hall sensor 350 may be disposed between the methane plate 520 and the pinion gear 320. The metal plate (520) may increase the magnetic flux in the closed loop and the hall sensor (350) may detect a change in the magnitude of the magnetic field measured according to the rotation of the pinion gear According to the above-described embodiment, the power transmission device 300 may identify the rotation angle of the pinion gear 320 using the hall sensor 350. By identifying the rotation angle of the pinion gear 320 through the hall sensor 350, the processor 120 (e.g., the processor 120 in FIG. 1) operatively connected to the hall sensor 350 may obtain a movement distance of the rack gear 330 according to rotation of the pinion gear 320. Since the hall sensor 350 and the magnet set 510 at a fixed position are used, the electronic device 101 (e.g., the electronic device 101 of FIG. 1) including the power transmission device 300 may prevent and/or reduce failure or damage of the hall sensor 350, and may improve the accuracy of the hall sensor 350 since a change in the magnetic field is detected at a fixed position.

By improving the accuracy of the hall sensor 350, the processor 120 may secure the rotation angle of the pinion gear 320 and the accuracy of the movement of the rack gear 330.

Figure 6:
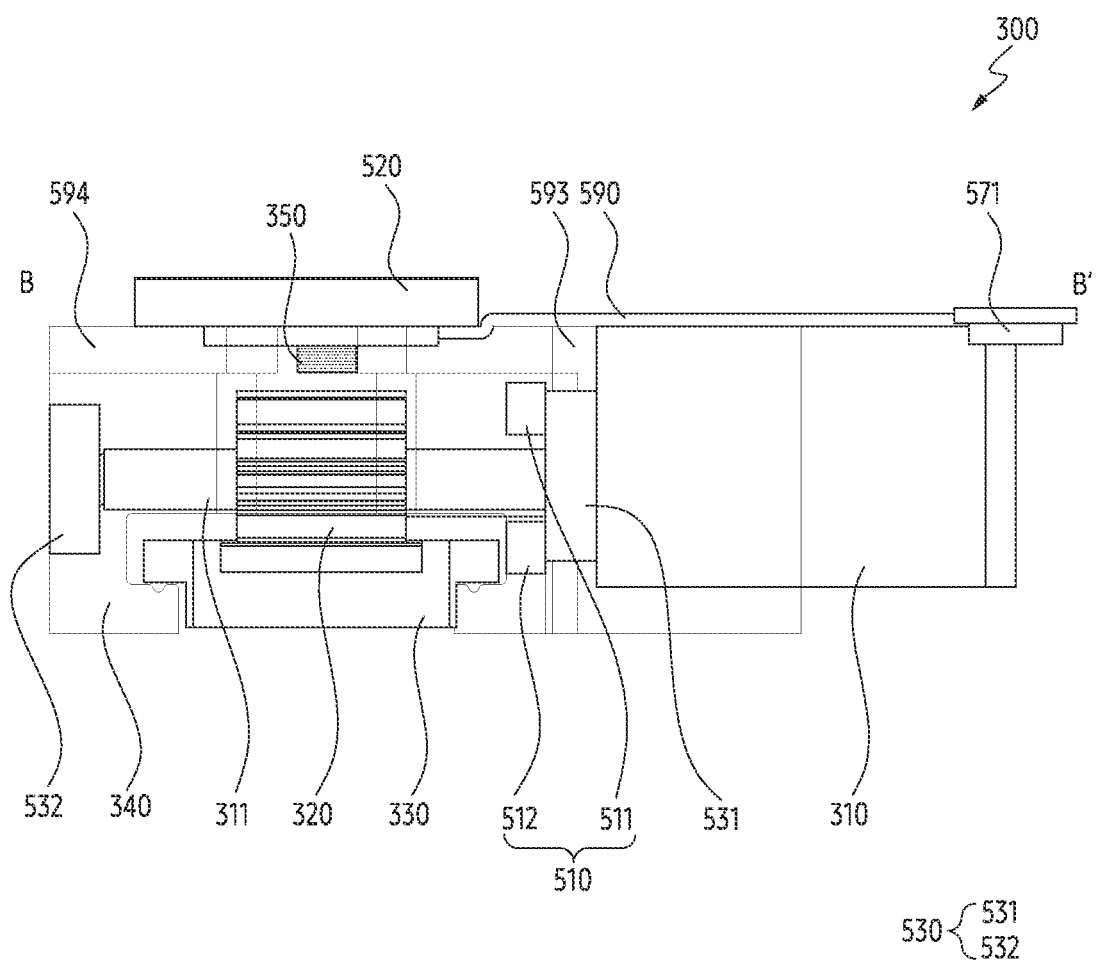
FIG. 6 is a cross-sectional view of the power transmission device of FIG. 5A taken along line B-B' according to an embodiment.
Figure 7:
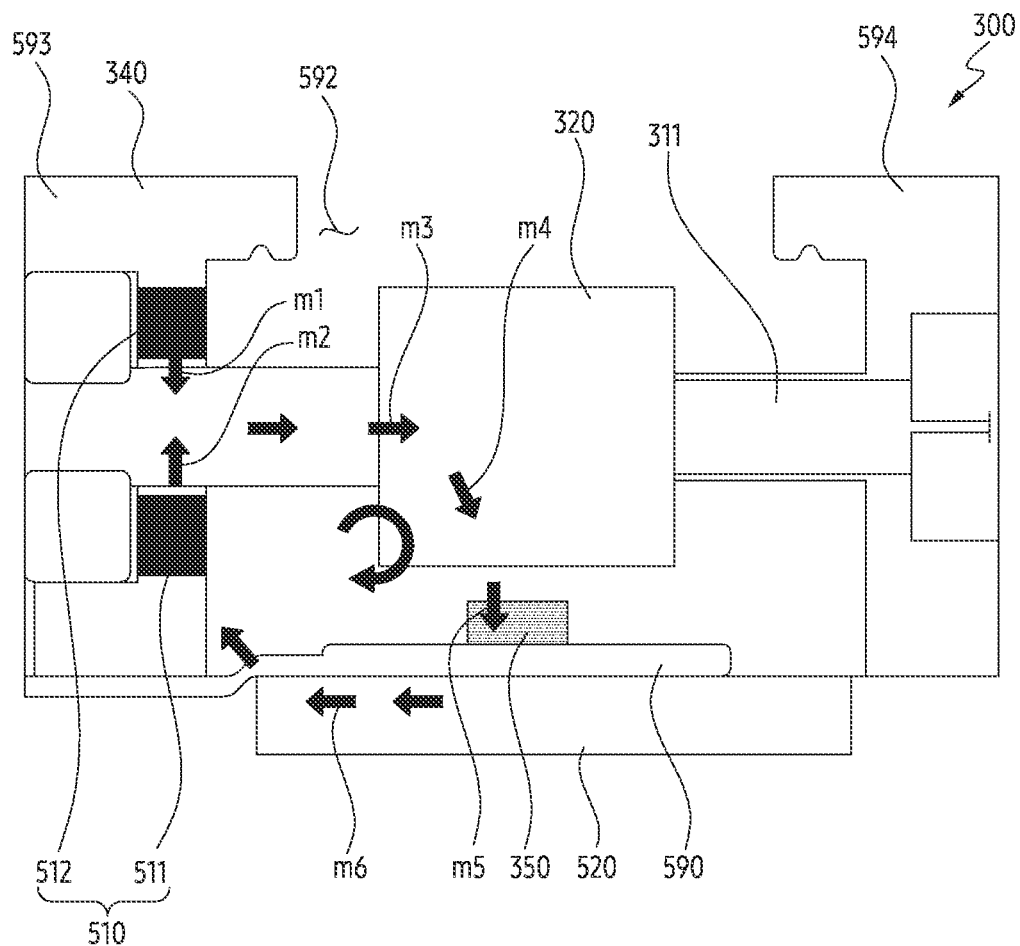
FIG. 7 is a diagram illustrating a magnetic force line formed in components of a power transmission device according to an embodiment.

FIG. 6 is a cross-sectional view of the power transmission device of FIG. 5A taken along line B-B' of FIG. 5A according to an embodiment, and. FIG. 7 is a diagram illustrating a magnetic force line formed in components of a power transmission device according to an embodiment.

Referring to FIGS. 6 and 7, in the second space 592, the arrangement relationship of the components of the power transmission device 300 and the flow of the magnetic force line are shown.

According to an embodiment, a shaft 311, a pinion gear 320, and a magnet set 510 may be disposed in the second space 592 of a motor housing 340. The shaft 311 and the pinion gear 320 may be formed of a ferromagnetic material. The bearings 531 and 532 disposed in the first partition wall 593 and the second partition wall 594 may be formed of a paramagnetic material. The bearings 531 and 532 may rotatably support the shaft 311. The motor housing 340 may accommodate the actuator 310 to fix the inside of the electronic device (e.g., the electronic device 101 of FIG. 1) and rotatably support the shaft 311. For example, the shaft 311 in the second space 592 of the motor housing 340 may be rotated by the actuator 310. Since the first partition wall 593 and the second partition wall 594 are rotatably disposed, friction force may be generated between the shaft 311 and the first partition wall 593, and the second partition wall 594. In order to prevent and/or reduce damage due to friction force between the shaft 311 and the first partition wall 593 and the second partition wall 594, a first bearing 531 disposed in the first partition wall 593 and a second bearing 532 disposed in the second partition wall 594 may be included. The first bearing 531 may surround the through portion of the shaft 311 in the first partition wall 593. The first bearing 531 and the second bearing 532 may be formed of a ball bearing, a rolling bearing, or the like. However, it is not limited thereto, and the first bearing 531 and the second bearing 532 may be a fluid bearing. According to an embodiment, the first bearing 531 and the second bearing 532 may be formed of a paramagnetic material.

According to an embodiment, a plurality of magnets 511 and 512 may be disposed to face each other. The plurality of magnets 511 and 512 are disposed to be in contact with the first partition wall 593 passing through the shaft 311, it is not limited thereto, and the plurality of magnets 511 and 512 may be disposed to be in contact with the second partition 594 facing the first partition 593.

The rack gear 330 and the hall sensor 350 may face each other around the pinion gear 320 or the shaft 311. The rack gear 330 may be in contact with the pinion gear 320 and may fill an open surface of the motor housing 340. The hall sensor 350 may be disposed on another surface facing one surface of the motor housing 340 on which the rack gear 330 is disposed. The hall sensor 350 may be disposed at one end of the printed circuit board 590. The other end of the printed circuit board 590 may have a connector 571. The printed circuit board 590 may extend from the motor housing 340 and extend along the surface of the actuator 310, and may be bent in a stepped area formed between the surface of the actuator 310 and the motor housing 340. For example, the printed circuit board 590 may be a flexible printed circuit board (FPCB) having flexibility. The printed circuit board 590 may be electrically connected to the hall sensor 350 on one surface thereof. The printed circuit board 590 may be disposed between the hall sensor 350 and the metal plate 520. The metal plate 520 may face the hall sensor 350 and may be attached to another surface of the printed circuit board 590. The hall sensor 350 may be mounted on one surface of the printed circuit board 590. The printed circuit board 590 may extend the flexible printed circuit board to the outside of the motor housing 340 to be connected to a motor connector or a main printed circuit board of the electronic device (e.g., the electronic device 101 of FIG. 1).

Referring to FIG. 7, a magnetic force line moving in the second space may form a closed curve. The first magnet 511 and the second magnet 512 may be disposed to face each other. A polarity of a surface of the second magnet 512 facing the first magnet 511 may be the same as a polarity of a surface of the first magnet 511 facing the second magnet 512. For example, the polarities of the surfaces of the first magnet 511 and the second magnet 512 facing the shaft 311 may be the same. The facing surfaces of the first magnet 511 and the second magnet 512 may be the same as N pole or the same as S pole. The direction of the magnetic flux m1 transmitted from the first magnet 511 to the shaft 311 may be a direction in which the first magnet 511 faces the shaft 311. The direction of the magnetic flux m2 transmitted from the second magnet 512 to the shaft 311 may be a direction in which the second magnet 512 faces the shaft 311. Since the shaft 311 and the pinion gear 320 are formed of a ferromagnetic material, a magnetic field may be strongly formed.

The direction of the magnetic flux m3 formed in the shaft 311 may be parallel to the rotation axis of the shaft 311. The direction of the magnetic flux m4 formed in the pinion gear 320 may be formed in a direction toward the metal plate 520. The metal plate 520 may be formed of a ferromagnetic material, and thus a magnetic force line may be guided toward the metal plate 520. The magnetic flux m5 passing through the hole sensor 350 may be formed in a direction toward the metal plate 520 by the magnetic force induced by the metal plate 520. Inside the metal plate 520, a direction of the magnetic flux m6 may face the magnet set 510, which is an extending direction of the metal plate 520.

According to an embodiment, the magnetic force line formed in the second space 592 of the motor housing 340 may form a closed curve formed along the magnet set 510, the shaft 311, the pinion gear 320, and the metal plate 520. The direction of the magnetic force in the second space 592 of the motor housing 340 may be formed in a clockwise direction. However, it is not limited thereto, and when the polarity of the arranged magnet set 510 is changed, the direction of the magnetic force may be formed in a counterclockwise direction. For example, when the polarities of the surfaces of the first magnet 511 and the second magnet 512 facing each other are N pole, the direction of the magnetic flux may be formed clockwise as shown in FIG. 7. For another example, when the polarities of the surfaces of the first magnet 511 and the second magnet 512 facing each other are S pole, the direction of operation may be formed in a counterclockwise direction.

According to the above-described embodiment, the magnitude and direction of the magnetic force formed in the second space 592 may be detected through the hall sensor 350. The hall sensor 350 may identify the magnetic force that changes according to a change in distance between the rotating pinion gear 320 and the hall sensor 350, and the processor (e.g., the processor 120 of FIG. 1) may detect a rotation angle and a rotation direction of the pinion gear based on the changed magnetic force.

According to an embodiment, the metal plate 520 may induce the magnetic force formed in the shaft 311 and the pinion gear 320 to the metal plate 520. For example, a magnitude of a magnetic field formed in a direction from the pinion gear 320 toward the metal plate 520 may be greater than a magnitude of a magnetic field formed in a direction from the pinion gear 320 toward a direction opposite to the metal plate 520. By disposing the metal plate 520 in contact with the hole sensor 350, the magnitude of the magnetic field formed around the hole sensor 350 may be large. Since the intensity of the magnetic force passing through the hole sensor 350 may be increased, the accuracy of detecting a change in the direction of the magnetic force and a change in the magnitude of the magnetic force may be increased through the hole sensor 350.

Figure 8A:
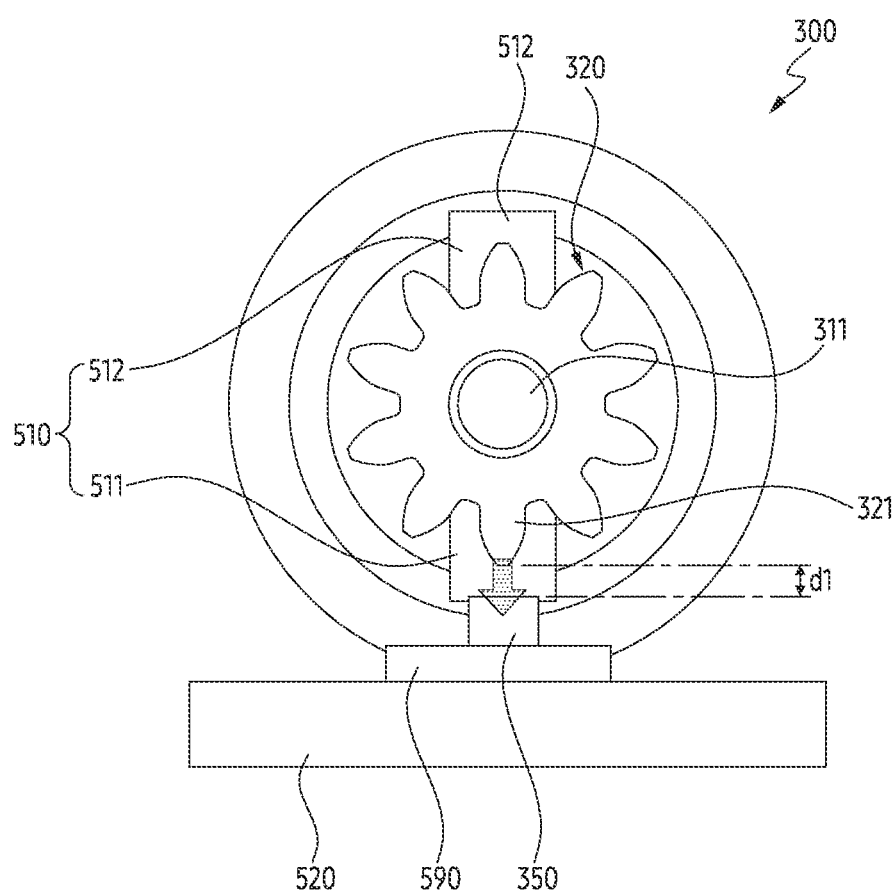
FIGS. 8A and 8B are diagrams illustrating a positional relationship between a gear tooth of a pinion gear of a power transmission device and a hall sensor according to an embodiment.
Figure 8B:
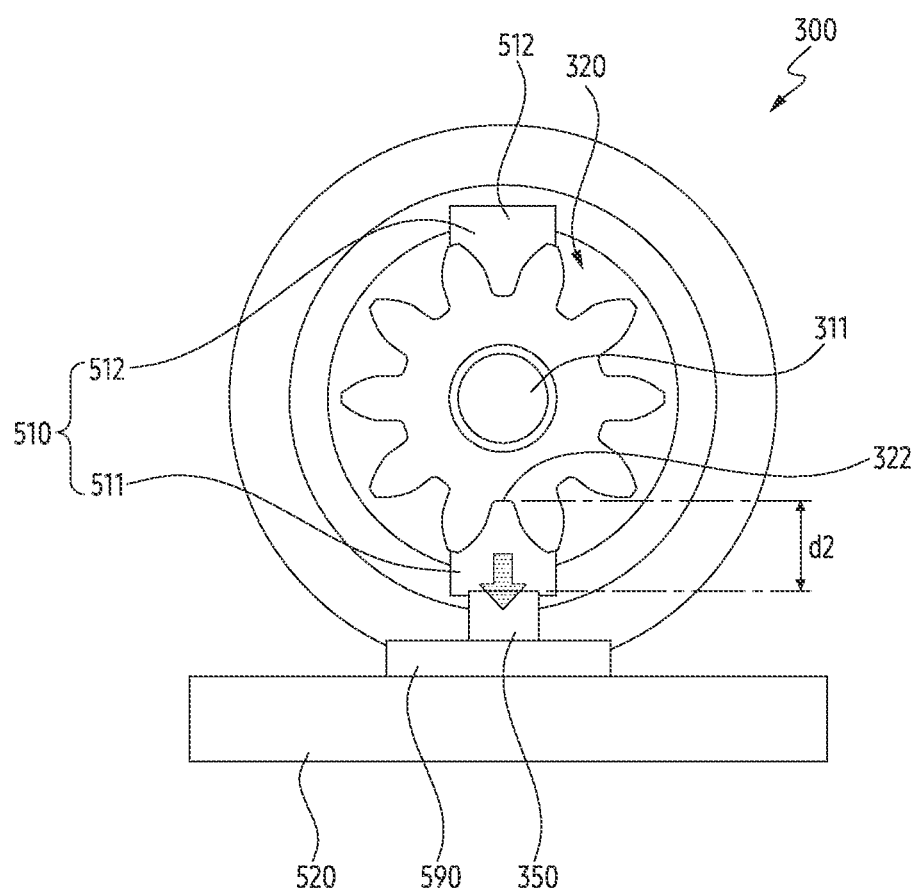

FIGS. 8A and 8B are diagrams illustrating a positional relationship between a gear tooth of a pinion gear of a power transmission device and a hall sensor according to an embodiment.

Referring to FIGS. 8A and 8B, the power transmission device 300 may comprise a pinion gear 320 and a hall sensor 350. The first magnet 511 and the second magnet 512 may be disposed above and below the shaft 311.

According to an embodiment, magnetic force may be transmitted from the magnet set 510 to the hall sensor 350 via the shaft 311 and the pinion gear 320. The hall sensor 350 may be disposed between the pinion gear 320 and the metal plate 520. Depending on the distance between the hall sensor 350 and the pinion gear 320, the magnitude of the magnetic force transmitted to the hall sensor 350 may be different.

According to an embodiment, the pinion gear 320 may include a gear tooth 321 and a gear root 322. As the pinion gear 320 rotates, the tooth 321 and the gear root 322 may alternately face the hall sensor 350. The distance d1 between the gear tooth 321 and the hole sensor 350 when the gear tooth 321 of the pinion gear 320 faces the hall sensor 350 may be shorter than the distance d2 between the surface of the gear root 322 and the hole sensor 350 when the gear root 322 of the pinion gear 320 faces the hall sensor 350.

Since the distance d1 is shorter than the distance d2, the magnitude of the magnetic force transmitted from the pinion gear 320 when the gear tooth 321 faces the metal plate 520 may be greater than the magnitude of the magnetic force transmitted from the pinion gear 320 when the gear root 322 of the pinion gear 320 faces the metal plate 520.

According to an embodiment, since the gear tooth 321 and the gear roots 322 alternately face the hall sensor 350 or the metal plate 520 when the pinion gear 320 rotates, the intensity and direction of the magnetic force may change periodically.

According to the above-described embodiment, the power transmission device 300 or the electronic device including the power transmission device 300 may detect the rotation angle of the pinion gear 320 by detecting the change in magnetic force according to the rotation of the pinion gear 320, and may identify the movement distance of the rack gear engaged with the pinion gear 320.

Figure 9A:
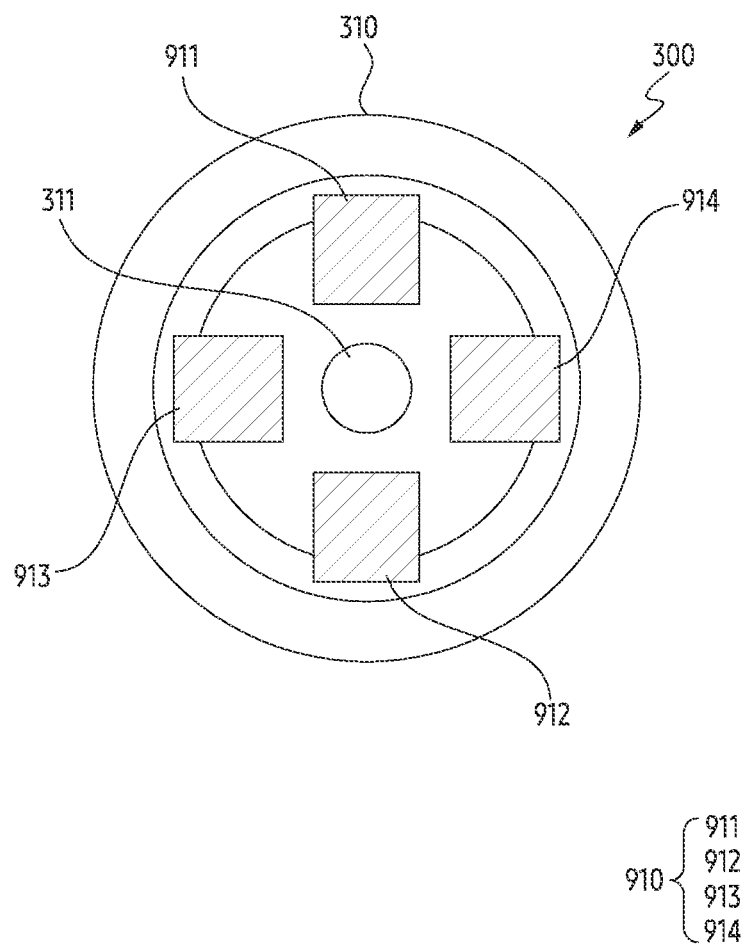
FIGS. 9A and 9B are diagrams illustrating examples of various arrangements of magnets in a power transmission device, according to an embodiment.
Figure 9B:
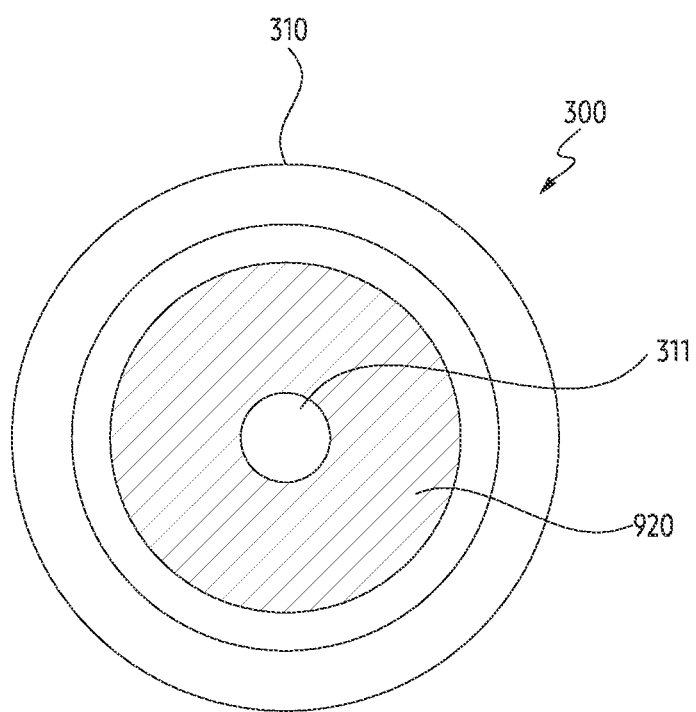

FIGS. 9A and 9B are diagrams illustrating examples of various arrangements of magnets in a power transmission device, according to an embodiment.

Referring to FIG. 9A, a power transmission device 300 may include a actuator 310, a shaft 311, and a plurality of magnet set 910. The plurality of magnet set 910 may form a magnetic field connected to a hall sensor 350 (e.g., the hall sensor 350 of FIG. 5B) through the shaft 311 and the pinion gear 320 (e.g., the pinion gear 320 of FIG. 4) connected to the shaft 311.

According to an embodiment, the magnet set 910 may include a plurality of magnets 911, 912, 913, and 914. The plurality of magnets 911, 912, 913, and 914 may be symmetrically disposed around the shaft 311. For example, the first magnet 911 may be disposed to face the second magnet 912, and the third magnet 913 may be disposed to face the fourth magnet 914. A distance between the first magnet 911 and the shaft 311 may be the same as a distance between the second magnet 912 and the shaft 311. A distance between the third magnet 913 and the shaft 311 may be the same as a distance between the fourth magnet 914 and the shaft 311. The first magnet 911 and the third magnet 913 may be point-symmetrical to the second magnet 912 and the fourth magnet 914 with respect to the center of the shaft 311. In a state in which the magnets 911, 912, 913 and 914 are disposed to surround the shaft 311 of the actuator 310, the magnetic flux transmitted to the shaft 311 as a whole may be maintained, since the total amount of magnetic flux induced from the magnets 911, 912, 913 and 914 may not change even when the vibration of the shaft 311 is generated by the operation of the actuator 310 and is biased to one side.

Referring to FIG. 9B, a power transmission device 300 may include an actuator 310, a shaft 311, and a magnet 920. The magnet 920 may include a round magnet. The magnet 920 may form a magnetic field connected to a hall sensor 350 through the shaft 311 and the pinion gear 320 connected to the shaft 311. The magnet 920 may surround a portion of the outer circumference surface of the shaft 311. A distance between the outer circumference surface of the shaft 311 and the inner circumference surface of the magnet 920 may be constant. The magnetic flux transmitted to the shaft 311 may be maintained as a whole, since the total amount of magnetic flux induced from the magnet 920 may not change even when the shaft 311 is biased to one side.

According to the above-described embodiment, since the total amount of magnetic flux transmitted to the shaft 311 may be maintained, the power transmission device 300 may improve the accuracy of the amount of change in magnetic flux detected through the hall sensor 350 for detecting magnetic flux transmitted through the shaft 311 and the pinion gear 320. By providing improved accuracy of the change in magnetic flux detected through the hall sensor 350, the electronic device 101 including the power transmission device 300 may accurately detect an increased distance of the display according to the movement of the rack gear 330. The electronic device 101 may control the activation area of the display according to the size of the display, and may adjust the size of the image displayed on the display.

Figure 10A:
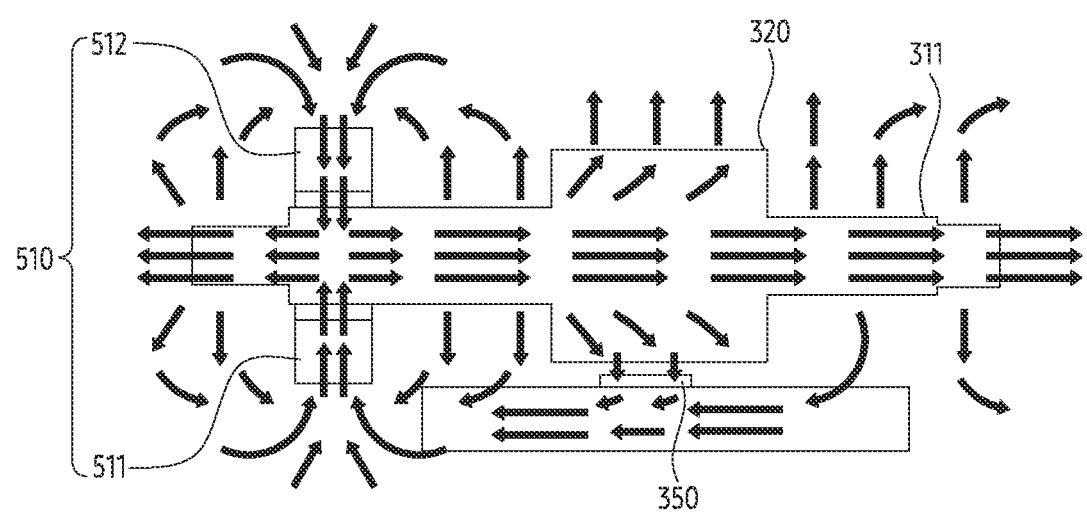
FIG. 10A is a diagram illustrating a magnetic force distribution formed surround a power transmission device according to an embodiment.
Figure 10B:
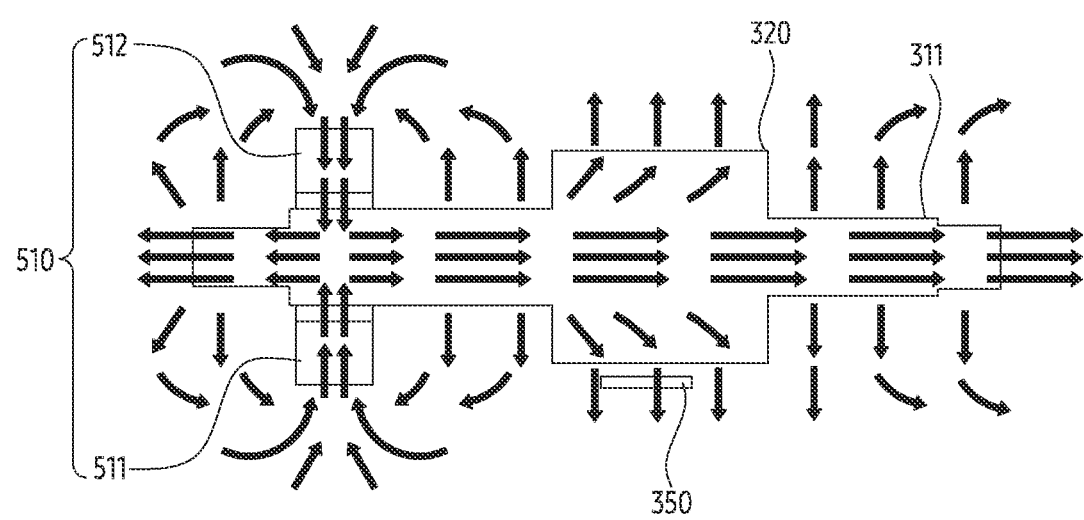
FIG. 10B is a diagram illustrating a magnetic force distribution formed surround a power transmission device including a metal for magnetic induction, according to an embodiment.

FIG. 10A is a diagram illustrating a magnetic force distribution formed surround a power transmission device according to an embodiment and FIG. 10B is a diagram illustrating a magnetic force distribution formed surround a power transmission device including a metal for magnetic induction, according to an embodiment.

Referring to FIG. 10A, the magnetic force passing from a magnet set 510 to a shaft 311, a pinion gear 320, and a hall sensor 350 may form a closed loop. The shaft 311 and the pinion gear 320 may be formed of a material having ferromagnetic material. Components disposed around the shaft 311 and the pinion gear 320 in the power transmission device 300 may be formed of a paramagnetic material. The magnetic force may tend to be strongly distributed in the ferromagnetic material.

According to an embodiment, the first magnet 511 may form a magnetic force toward the shaft 311 which is a ferromagnetic material and the second magnet 512 may form a magnetic force toward the shaft 311 which is a ferromagnetic material. A surface of the first magnet 511 facing the shaft 311 may have the same polarity as a surface of the second magnet 511 facing the shaft 311. The polarity of the surface facing the shaft 311 of the first magnet 511 may be an N pole, and the polarity of the surface facing the shaft 311 of the second magnet 512 may be an N pole. The magnetic force of the first magnet 511 transmitted to the shaft 311 and the magnetic force of the second magnet 512 may have the same polarity and may spread to both sides at the point of meeting. The magnetic force transmitted to the pinion gear 320 along the shaft 311 may be formed in a direction of returning to the magnet set 510. In a region away from the magnet set 510 along the shaft 311, the influence of the magnetic field by the magnet set 510 may be further away.

Referring to FIG. 10B, since the hole sensor 350 is in contact with the metal plate 520, the metal plate 520 may change a flow of a magnetic field formed in the power transmission device 300. The metal plate 520 is a ferromagnetic body and may attract magnetic force transmitted to the outside of the shaft 311 and the pinion gear 320 to the metal plate 520. For example, the metal plate 350 may concentrate the magnetic force transmitted from the pinion gear 320 and change the direction of the magnetic force to the direction of the length of the metal plate 350.

According to an embodiment, the metal plate 350 may amplify the intensity of the magnetic field measured through the hall sensor 350 by enhancing the intensity of the magnetic force and amplify not only a component perpendicularly passing through the hall sensor 350 but also a magnetic force component in the parallel direction to the hall sensor 350. Through the arrangement of the metal plate 520, amount of change in magnetic force of two directions may largely occur, and the hall sensor 350 may obtain a rotation direction and a rotation degree of the pinion gear 320. For example, the permeability of the magnetic force may be high, and the magnetic force may be induced to adjacent metals. Through the metal plate 520 formed close to the pinion gear 320, the magnetic force may form a closed loop connecting the magnet set 510, the shaft 311, and the metal plate 520. By the metal plate 520, a larger magnetic force is formed around the hall sensor 350, and thus the hall sensor 350 may increase accuracy of detecting the magnetic force.

Figure 11A:
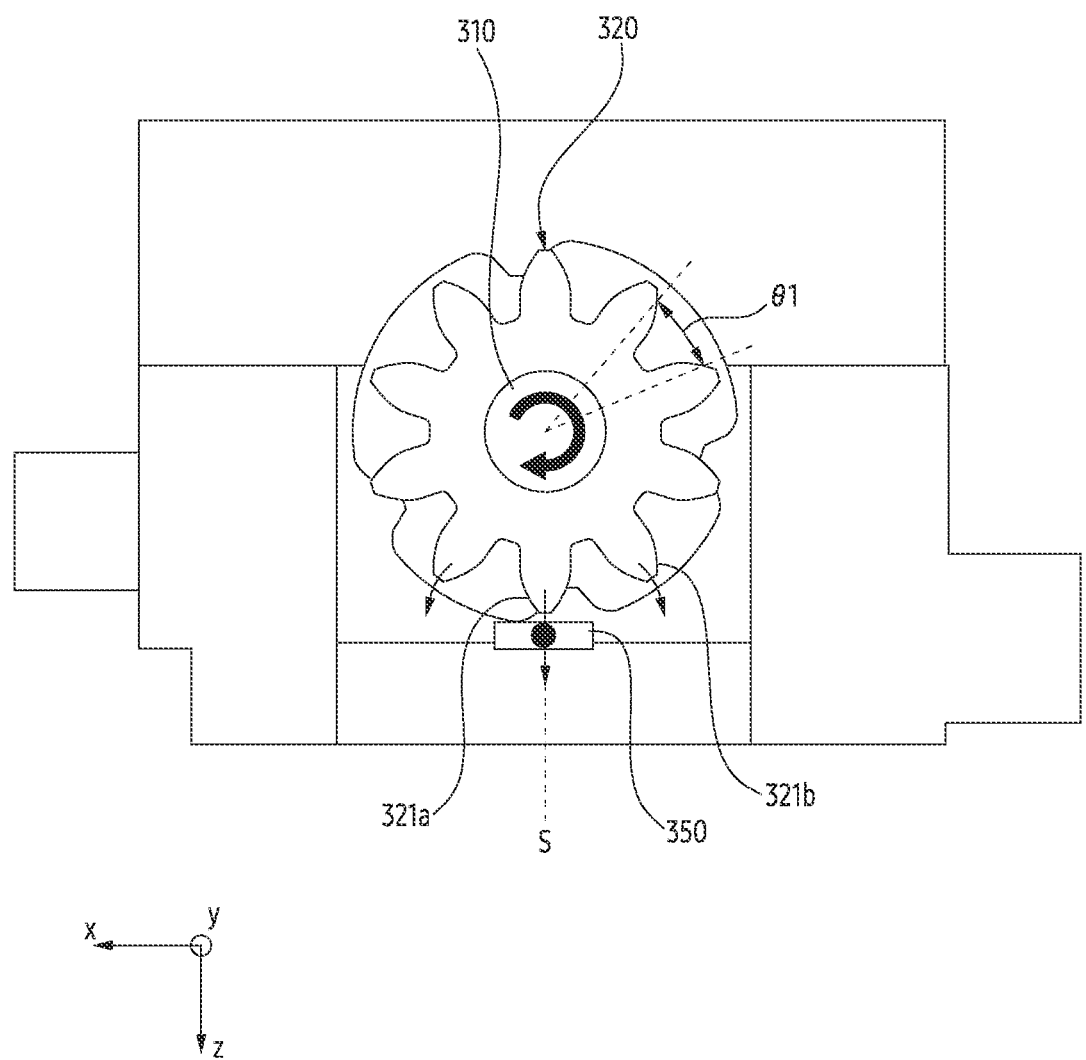
FIG. 11A is a diagram illustrates a relationship between a rotation angle of a pinion gear of a power transmission device and a hall sensor according to an embodiment.
Figure 11B:
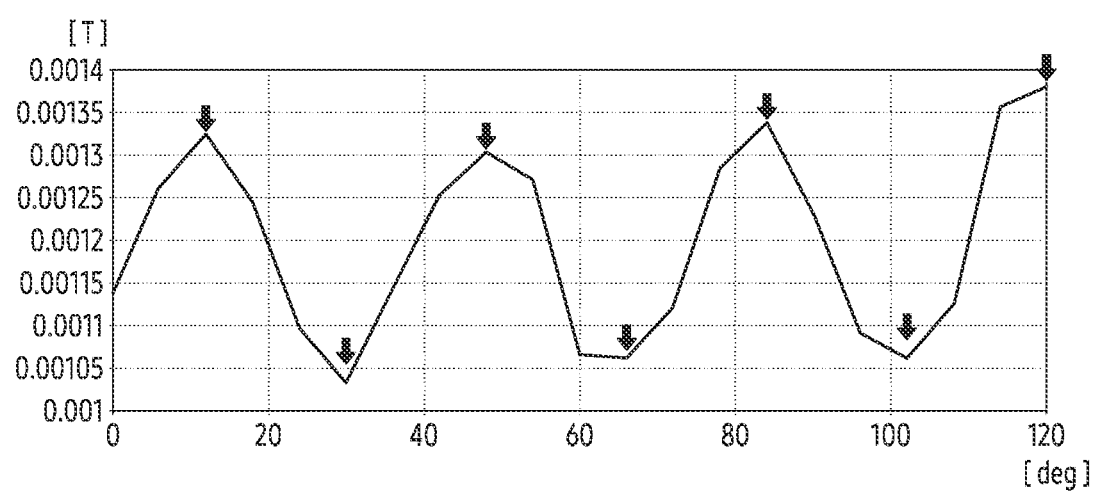
FIGS. 11B and 11C are graphs illustrating a change in a magnetic field magnitude according to a position of a pinion gear of a power transmission device, according to an embodiment.
Figure 11C:
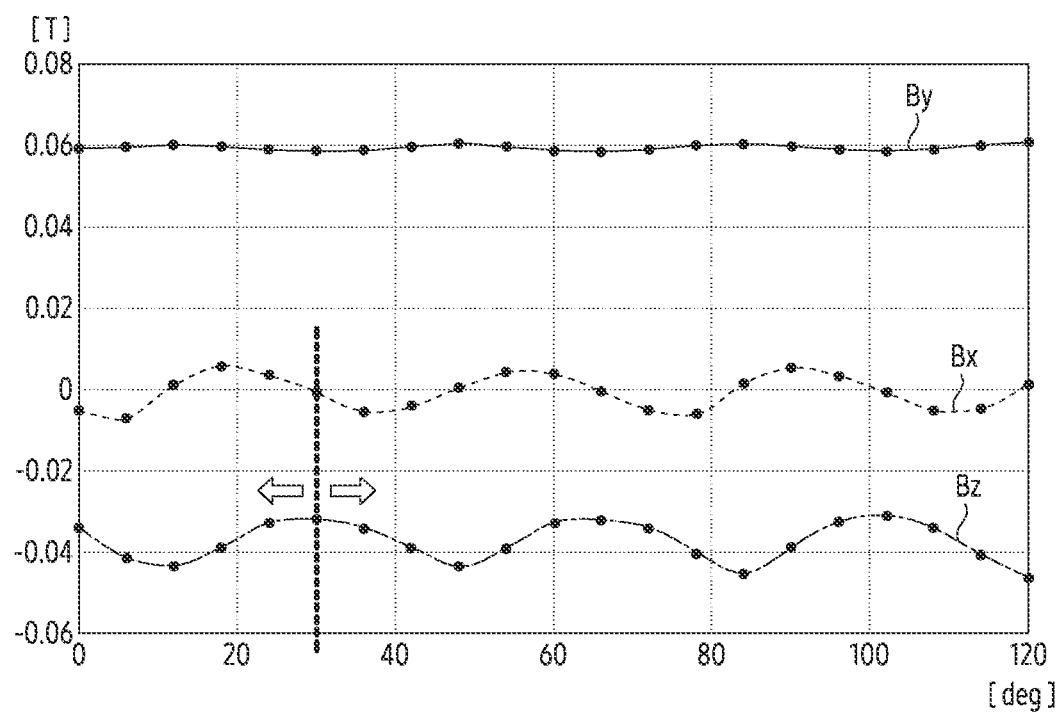

FIG. 11A is a diagram illustrating an example relationship between a rotation angle of a pinion gear of a power transmission device and a hall sensor according to an embodiment FIGS. 11B and 11C are graphs illustrating a change in a magnetic field magnitude according to a position of a pinion gear of a power transmission device, according to an embodiment.

Referring to FIG. 11A, the pinion gear 320 may include a plurality of gear teeth 321a and 321b. The plurality of gear tooth 321a and 321b may be 10, and the angle (Θ1) between the gear teeth may be 36 degrees.

According to an embodiment, when the gear tooth of the plurality of gear teeth 321a and 321b of the pinion gear 320 approach the hole sensor 350, the magnitude of the magnetic force S detected through the hole sensor 350 may increase. For example, when the first gear tooth 321a is disposed close to the hall sensor 350, the magnetic force detected by the hole sensor 350 in the z-axis direction may be stronger than the magnetic force when a surface of a gear root between the first gear tooth 321a and the second gear tooth 321b faces the hole sensor 350.

When the gear tooth of the plurality of gear teeth 321a and 321b of the pinion gear 320 approach the hole sensor 350, the magnetic force in the x-axis direction may change. For example, when the first gear tooth 321a is disposed close to the hole sensor 350 and then moved away, the influence of the first gear tooth 321a is large, and thus the magnetic force in the x-axis direction may decrease. At a point where the influence of the second gear tooth 321b is greater than the influence of the first gear tooth 321a, the magnetic force in the x-axis direction may increase.

According to an embodiment, when the surface of the gear root between the plurality of gear teeth 321a and 321b of the pinion gear 320 faces the hall sensor 350, the magnetic force in the z-axis direction may be weak, and the magnetic force in the x-axis direction may change. For example, when the surface of the gear root moves away from the hole sensor 350, the influence of the second gear tooth 321b increases, and thus the magnetic force in the x-axis direction may increase.

Referring to FIG. 11B, the magnitude of the magnetic field in the z-axis direction obtained through the hole sensor 350 may have an upper end value when it is 12 degrees, and then, may have an upper end value at a period of 36 degrees. The magnitude of the magnetic field in the z-axis direction obtained through the hall sensor 350 may have a lower end value when it is 30 degrees, and then, may have a lower end value at a period of 36 degrees.

The hall sensor 350 may detect rotation by $\frac{1}{10}$ per period based on the upper end value. For example, the hall sensor 350 may detect rotation by 36 degrees per period based on the upper end value.

Referring to FIG. 11C, the electronic device 101 or the power transmission device 300 may identify a rotation direction of the pinion gear 320 based on the amount of change in the magnetic field in the z-axis direction and the amount of change in the magnetic field in the x-axis direction obtained through the hall sensor 350.

When the pinion gear 320 rotates clockwise as shown in FIG. 11A, the magnetic field in the x-axis direction may be in a decreasing trend when the magnitude of the magnetic field in the z-axis direction obtained through the hall sensor 350 has an upper end value. When the pinion gear 9320 is rotated counterclockwise unlike FIG. 11A, the magnetic field in the x-axis direction may be increasing trend when the magnitude of the magnetic field in the z-axis direction obtained through the hall sensor 350 has an upper end value.

According to the above-described embodiment, the electronic device 101 may detect that the actuator 310 rotates in a forward direction or in a reverse direction by comparing the magnitude of the magnetic field in the x-axis direction and the magnitude of the magnetic field in the z-axis direction through the hall sensor 350. According to an embodiment, the electronic device 101 may identify whether the display is being enlarged or the display is being reduced based on detecting the rotation direction of the actuator 310.

According to an embodiment, the size of the activation area of the display may be identified based on the period of the upper end value of the magnetic field in the z-axis direction detected through the hall sensor 350.

According to an example embodiment, an electronic device (e.g., the electronic device 200 of FIG. 4) may comprise: a first housing (e.g., the first housing 210 of FIG. 4), a second housing (e.g., the second housing 220 of FIG. 4) slidably coupled to the first housing, a rollable display (e.g., the flexible display 230 of FIG. 2B) configured to be enlarged or reduced based on a movement of the second housing, a rack gear (e.g., the rack gear 330 in FIG. 4) disposed on the second housing, a pinion gear (e.g., pinion gear 320 in FIG. 4) driven in engagement with the rack gear, an actuator (e.g., drive unit 310 in FIG. 4) configured to rotate the pinion gear and coupled with the pinion gear by a shaft, a first magnet (e.g., first magnet 511 in FIG. 5B) surrounding at least part of the shaft, and spaced apart from the pinion along to the shaft, and a hall sensor (e.g., hall sensor 350 in FIG. 4) spaced apart from the pinion gear in a direction perpendicular to the shaft, and a processor (e.g., the processor 120 in FIG. 1), wherein the processor is configured to obtain data related to a change in the magnetic force using the hall sensor and identify a rotating angle of the pinion gear based on the data related to a change in the magnetic force.

According to an example embodiment, the electronic device may further comprise a second magnet (e.g., the second magnet 512 of FIG. 5B) facing the first magnet, with respect to the shaft, and the polarity of each of the first magnet and the second magnet facing the shaft may be the same.

According to an example embodiment, the magnet may include a through hole through which the shaft passes.

According to an example embodiment, the electronic device may further comprise: a printed circuit board (e.g., printed circuit board 590 in FIG. 6) having a surface connected to the hall sensor and a metal plate (e.g., metal plate 520 in FIG. 6) disposed on another surface of the printed circuit board.

According to an example embodiment, the pinion gear may overlap the metal plate, when looking at the metal plate from above.

According to an example embodiment, the pinion gear may be disposed between the first magnet and the actuator.

According to an example embodiment, the first magnet may be disposed between the pinion gear and the actuator.

According to an example embodiment, the pinion gear and the shaft may comprise a ferromagnetic material.

According to an example embodiment, the electronic device may further comprise: a motor housing (e.g., motor housing 340 in FIG. 3) surrounding the actuator and surrounding a portion of the pinion gear, and comprising a paramagnetic material, wherein the magnet may be disposed within the motor housing.

According to an example embodiment, the motor housing may include a partition wall (e.g., the first partition wall 593 or the second partition wall 594 of FIG. 5B) rotatably supporting the shaft and a bearing disposed between the partition wall and the shaft.

According to an example embodiment, the first magnet may be attached to a surface facing the pinion gear of the support on which the bearing is disposed.

According to an example embodiment, a magnetic force line generated by the first magnet may include a closed curve passing through the first magnet, the shaft, and the pinion gear.

According to an example embodiment, a magnitude and direction of a magnetic field detected by the hall sensor may change based on a distance between a tooth of the pinion gear and one surface of the hall sensor.

According to an example embodiment, the processor may be configured to identify a movement distance of the pinion gear, based on a change in a magnetic field passing through the hall sensor.

According to an example embodiment, the processor may be configured to identify a rotational direction of the pinion gear, based on a change in a magnetic field passing through the hall sensor and a change in a magnetic field in a fourth direction perpendicular to the hall sensor.

According to an example embodiment, a power transmission device (e.g., power transmission device 300 in FIG. 5A) may comprise: a motor housing (e.g., motor housing 340 of FIG. 5B) including a first space (e.g., the first space 591 of FIG. 5B) and a second space (e.g., the second space 592 of FIG. 5B) distinct from the first space, a motor (e.g., the drive unit 310 of FIG. 5A) disposed within the first space in the motor housing, a shaft (e.g., the shaft 311 of FIG. 5B) disposed within the second space, the shaft extending from the motor and configured to be rotated by the motor, a partition wall (e.g., the partition wall 593 of FIG. 5B) separating the first space and the second space, a pinion gear (e.g., pinion gear 320 of FIG. 5B) disposed within the second space, the pinion gear coupled to the shaft and including a plurality of teeth, a first magnet (e.g., a plurality of magnets 511 and 512 of FIG. 5B) surrounding a portion of the shaft and spaced apart from the pinion gear along to the shaft; and a hall sensor (e.g., hall sensor 350 of FIG. 5B) spaced apart from the pinion gear in a direction perpendicular to the rotating axis direction of the shaft, and configured to detect a magnetic force transmitted from the first magnet through the shaft and the pinion gear.

According to an example embodiment, the power transmission device may further comprise: a rack gear (e.g., the rack gear 330 of FIG. 5A) including a plurality of teeth disposed on a plane having a length and engaging with the pinion gear.

According to an example embodiment, the power transmission device may further comprise a second magnet (e.g., the second magnet 512 of FIG. 5B) facing the first magnet (e.g., the first magnet 511 of FIG. 5B) with respect to the shaft, and wherein a polarity of surfaces of the first magnet and the second magnet facing each other may be the same.

According to an example embodiment, the first magnet may include a through hall through which the shaft passes.

According to an example embodiment, the power transmission device may further comprise: a printed circuit board (e.g., printed circuit board 590 in FIG. 5B) having a surface connected to the hall sensor, and a metal plate (e.g., the metal plate 520 of FIG. 5B) disposed on another surface of the printed circuit board.

According to an example embodiment, the pinion gear may overlap the metal plate, when viewed in a direction from the pinion gear toward the hall sensor.

According to an example embodiment, the pinion gear may be disposed between the first magnet and the motor.

The electronic device according to an embodiment may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with an embodiment of the disclosure, the term "module" may include a unit implemented in hardware, software, or firmware, or any combination thereof, and may be interchangeably used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

An embodiment as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment of the disclosure, a method according to an embodiment of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, each component (e.g., a module or a program) of the above-described components may include a single entity or multiple entities, and some of the multiple entities may be separately disposed in different components. According to an embodiment of the disclosure, one or more of the above-described components may be omitted, or one or more other components may be added. Alternatively or additionally, a plurality of components (e.g., modules or programs) may be integrated into a single component. In such a case, according to an embodiment of the disclosure, the integrated component may still perform one or more functions of each of the plurality of components in the same or similar manner as they are performed by a corresponding one of the plurality of components before the integration. According to an embodiment of the disclosure, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to an embodiment, it will be understood that the embodiment are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a housing including a first housing part and a second housing part movably coupled relative to the first housing part between a retracted position and an extended position;
   a flexible display coupled to the housing, wherein a size of an area of the flexible display that is visible from an outside of the electronic device changes as the second housing part is moved relative to the first housing part;
   at least one magnet;
   a rack gear coupled to the housing;
   a pinion gear configured to be engaged with the rack gear;
   an actuator configured to rotate the pinion gear;
   a hall sensor is configured to detect a magnetic field changed by rotation of the pinion gear, and
   a metal plate including a ferromagnetic material to induce magnetic field;
   wherein the hall sensor is disposed at between the metal plate and the pinion gear,
   wherein a relative position between the at least one magnet and the hall sensor is maintained while the pinion gear is rotated, and
   at least one processor comprising processing circuitry;
   memory storing instructions that, when executed by the at least one processor individually or collectively, cause to electronic device to:
   obtain, through the hall sensor, data indicating the magnetic field changed by rotating the pinion gear; and
   identify a rotating angle and/or a rotating direction of the pinion gear based on the data related to a change in the magnetic field.

2. The electronic device of claim 1, wherein a distance between the at least one magnet and the hall sensor is maintained while the second housing part is moved relative to the first housing part between the retracted position and the extended position.

3. The electronic device of claim 1, wherein the at least one magnet comprises a first magnet and a second magnet facing the first magnet with respect to a shaft of the actuator coupled to the pinion gear, and
   wherein a polarity of the first magnet toward the shaft is the same as a polarity of the second magnet toward the shaft.

4. The electronic device of claim 1, further comprising:
a printed circuit board having a surface connected to the hall sensor; and
wherein the metal plate disposed on another surface of the printed circuit board; and
wherein the pinion gear overlaps the metal plate, when viewing the metal plate from above.

5. The electronic device of claim 1,
wherein the pinion gear is disposed between the at least one magnet and the actuator.

6. The electronic device of claim 1,
wherein the at least one magnet is disposed between the pinion gear and the actuator.

7. The electronic device of claim 1,
wherein the pinion gear comprises a ferromagnetic material.

8. The electronic device of claim 1, further comprising:
a motor housing surrounding the actuator and surrounding a portion of the pinion gear, and comprising a paramagnetic material; and
wherein the at least one magnet is disposed within the motor housing.

9. The electronic device of claim 8, wherein the motor housing includes a support rotatably supporting a shaft of the actuator coupled to the pinion gear and a bearing disposed between the support part and the shaft.

10. The electronic device of claim 9, wherein the at least one magnet is attached to a surface facing the pinion gear of the support on which the bearing is disposed.

11. The electronic device of claim 1, wherein the magnetic field generated by the at least one magnet includes a line forming a closed curve passing through the pinion gear.

12. The electronic device of claim 1, wherein a magnitude and a direction of a magnetic field detected by the hall sensor changes sinusoidally based on a distance between a tooth of the pinion gear and one surface of the hall sensor.

13. The electronic device of claim 1,
wherein the instructions, when executed by the at least one processor individually and collectively, cause the electronic device to:
identify the area of the flexible display by identifying the rotating angle and/or the rotating direction of the pinion gear based on the data related to a change in the magnetic field.

14. The electronic device of claim 13, wherein the instructions, when executed by the at least one processor individually and collectively, cause the electronic device to:
identify a movement distance of the second housing part based on the rotating angle and/or the rotating direction of the pinion gear based on the data related to a change in the magnetic field, and
identify the area of the flexible display based on the movement distance.

15. A power transmission device comprising:
a motor housing including a first space and a second space distinct from the first space;
a motor disposed within the first space in the motor housing;
a shaft disposed within the second space, the shaft extending from the motor and configured to be rotated by the motor;
a partition wall separating the first space and the second space;
a pinion gear disposed within the second space, the pinion gear coupled to the shaft and including a plurality of teeth;
a first magnet;
a second magnet facing the first magnet with respect to the shaft;
a hall sensor configured to detect a magnetic field changed by rotation of the pinion gear, and
a metal plate including a ferromagnetic material to induce magnetic field; and
wherein a relative position among the first magnet, the second magnet and the hall sensor is maintained while the pinion gear is rotated, and
wherein a polarity of surfaces of the first magnet and the second magnet facing each other is the same.

16. The power transmission device of claim 15, further comprising:
a rack gear including a plurality of teeth disposed on a plane having a length and engaging with the pinion gear.

17. A power transmission device comprising:
a motor housing including a first space and a second space distinct from the first space;
a motor disposed within the first space in the motor housing;
a shaft disposed within the second space, the shaft extending from the motor and configured to be rotated by the motor;
a partition wall separating the first space and the second space;
a pinion gear disposed within the second space, the pinion gear coupled to the shaft and including a plurality of teeth;
at least one magnet;
a hall sensor configured to detect a magnetic field changed by rotation of the pinion gear, and
a metal plate including a ferromagnetic material to induce magnetic field; and
wherein a relative position between the at least one magnet and the hall sensor is maintained while the pinion gear is rotated, and
wherein the at least one magnet includes a through hole through which the shaft passes.

18. The power transmission device of claim 15, further comprising:
a printed circuit board having a surface connected to the hall sensor; and
wherein the metal plate is disposed on another surface of the printed circuit board, and
wherein the pinion gear overlaps the metal plate, when viewed in a direction from the pinion gear toward the hall sensor.

19. The power transmission device of claim 15, wherein the pinion gear is disposed among the first magnet, the second magnet and the motor.

* * * * *